US006696143B1

United States Patent
La Point

(10) Patent No.: US 6,696,143 B1
(45) Date of Patent: Feb. 24, 2004

(54) ABRASION RESISTANT COATING COMPOSITIONS, METHODS FOR MAKING THEM, AND ARTICLES COATED WITH THEM

(76) Inventor: David A. La Point, 6721 Red Coach, Huntington Beach, CA (US) 92647

( * ) Notice: Subject to any disclaimer, the term of this patent is extended or adjusted under 35 U.S.C. 154(b) by 171 days.

(21) Appl. No.: 09/534,101

(22) Filed: Mar. 23, 2000

Related U.S. Application Data

(60) Provisional application No. 60/147,328, filed on Aug. 5, 1999, and provisional application No. 60/126,587, filed on Mar. 26, 1999.

(51) Int. Cl.$^7$ .............................. B32B 7/02; B32B 15/08
(52) U.S. Cl. ...................... 428/216; 428/213; 428/215; 428/425.5; 428/425.8; 428/450; 428/451
(58) Field of Search ................................ 428/213, 215, 428/216, 447, 450, 451, 425.5, 425.8

(56) References Cited

U.S. PATENT DOCUMENTS

| | | | |
|---|---|---|---|
| 3,451,838 A | 6/1969 | Burzynski et al. | 117/33.3 |
| 3,617,458 A | 11/1971 | Brockman et al. | 204/181 |
| 3,679,564 A | 7/1972 | Dowbenko et al. | 204/181 |
| 3,707,397 A | 12/1972 | Gagnon | 117/72 |
| 3,869,366 A | 3/1975 | Suzuki et al. | 204/181 |
| 3,922,253 A | 11/1975 | Jerabek et al. | 260/77.5 |
| 3,947,338 A | 3/1976 | Jerabek et al. | 204/181 |
| 3,981,897 A | 9/1976 | Crivello | 260/440 |
| 3,986,997 A | 10/1976 | Clark | 260/29.2 M |
| 4,027,073 A | 5/1977 | Clark | 428/412 |
| 4,058,444 A | 11/1977 | Shibayama et al. | 204/181 |
| 4,136,102 A | 1/1979 | Crivello | 260/440 |
| 4,207,357 A | 6/1980 | Goossens | 427/162 |
| 4,241,200 A | 12/1980 | Woo | 525/455 |
| 4,242,381 A | 12/1980 | Goossens | 427/387 |

(List continued on next page.)

OTHER PUBLICATIONS

Benchmark Products, *Technical Data Bulletin* for BENCHMATE 320 P Aug. 6, 1991.
Benchmark Products, *Material Safety Data Sheet* Aug. 6, 1991.
ClearClad Coatings, Inc., *Installation and Operation Manual*, Release No. 2.0, Manual Ser. No: 1192, 1997.
N. Z. Erdy, et al., "Preparation of Block Copolymers by Use of Peroxide–Terminated Prepolymer", *Journal of Polymer Science: Part A–I*, vol. 8, pp. 763–769 (1970), Department of Chemistry, Princeton University, Princeton, New Jersey.
Otto Gelner, "Surface–Active Agents", *Encylopedia of Polymer Science and Technology*, vol. 13, pp. 477–486, 1970, Interscience Publishers, New York.
GE Silicones, "UVHC 8558 Abrasion Resistant Silicone and Hard Coat Fast Cure", product description sheet 4979, (12/94).
GE Silicones, product description 5208 for SHC 5020, (6/98).
GE Silicones, product description 5276 for SHC 6000, (6/98).
GE Silicones, *Material Safety Data Sheet* for UVHC 8558 Feb. 12, 1993.

(List continued on next page.)

Primary Examiner—D. S. Nakarani
(74) Attorney, Agent, or Firm—Christie, Parker & Hale, LLP

(57) ABSTRACT

A coating composition includes a cured base coat of synthetic resin covered by a cured top coat of a silica-containing resin. The top coat resin is applied in an uncured state to the cured base coat. The two resins are thereafter heated to at least 140° F., and thereafter the top coat resin is cured to produce the coating composition. A clean metal surface is coated with the coating composition by applying uncured base coat resin to the metal surface, curing the base coat resin, and thereafter applying the top coat as described above.

13 Claims, 2 Drawing Sheets

U.S. PATENT DOCUMENTS

| | | | |
|---|---|---|---|
| 4,284,685 A | 8/1981 | Olson et al. | 428/331 |
| 4,308,317 A | 12/1981 | Olson et al. | 428/412 |
| 4,313,979 A | 2/1982 | Frye et al. | 427/387 |
| 4,320,172 A | 3/1982 | Takamizawa et al. | 428/447 |
| 4,348,462 A | 9/1982 | Chung | 428/412 |
| 4,353,959 A | 10/1982 | Olson et al. | 428/331 |
| 4,373,060 A | 2/1983 | Ching | 524/767 |
| 4,416,753 A | 11/1983 | Batzill et al. | 204/181 C |
| 4,477,642 A | 10/1984 | Geist et al. | 528/61 |
| 4,496,672 A | 1/1985 | Batzill et al. | 523/404 |
| 4,547,409 A | 10/1985 | Geist et al. | 427/386 |
| 4,554,212 A | 11/1985 | Diefenbach et al. | 428/413 |
| 4,612,049 A | 9/1986 | Berner et al. | 106/14.13 |
| 4,615,947 A | 10/1986 | Goossens | 428/412 |
| 4,617,331 A | 10/1986 | Boberski et al. | 523/420 |
| 4,618,657 A | 10/1986 | Katchko et al. | 525/443 |
| 4,624,870 A | 11/1986 | Anthony | 427/387 |
| 4,869,796 A | 9/1989 | Kanda et al. | 204/181.6 |
| 4,895,887 A | 1/1990 | Daimon et al. | 524/265 |
| 4,939,216 A | 7/1990 | Lawrenze et al. | 525/454 |
| 4,973,392 A | 11/1990 | Gupta | 204/181.7 |
| 5,021,266 A | 6/1991 | Yamaya et al. | 427/379 |
| 5,034,262 A | 7/1991 | Komatsu et al. | 428/212 |
| 5,091,460 A | 2/1992 | Seto et al. | 524/492 |
| 5,120,811 A | 6/1992 | Glotfelter et al. | 528/25 |
| 5,137,573 A | 8/1992 | Daimon et al. | 106/287.16 |
| 5,242,719 A | 9/1993 | Medford et al. | 427/515 |
| 5,260,350 A | 11/1993 | Wright | 522/42 |
| 5,286,569 A * | 2/1994 | Werner, Jr. et al. | 428/423.1 |
| 5,342,658 A | 8/1994 | Hong et al. | 427/515 |
| 5,350,636 A | 9/1994 | Huemke et al. | 428/418 |
| 5,401,823 A | 3/1995 | Huemke et al. | 528/45 |
| 5,468,789 A | 11/1995 | Lewis et al. | 524/99 |
| 5,518,818 A | 5/1996 | Kidai et al. | 428/412 |
| 5,607,729 A | 3/1997 | Medford | 427/495 |
| 5,708,048 A | 1/1998 | Medford et al. | 522/64 |
| 5,712,325 A | 1/1998 | Lewis et al. | 522/83 |
| 5,756,221 A | 5/1998 | Horibe et al. | 428/626 |
| 5,998,013 A | 12/1999 | Shoshi et al. | 428/331 |

OTHER PUBLICATIONS

GE Silicones, *Material Safety Data Sheet* for UVHC 3000 hard coat Apr. 1, 1999.

Kirk–Othmer, "Surfactants", *Encyclopedia of Chemical Technology*, vol. 19, pp. 507–593, Interscience Publishers, New York, pp. 1969.

DL Poczynok, "Synthesis, Characterization and Copolymerization of Heptamethycyclotetrasiloxane–YL Modified Silica and Polycyclosiloxanes", *Dissertation Abstracts International*, Grand vol. 55/08–B, p. 3337, May 1994.

Solin Products, Inc., "Material Safety Data Sheet" for AC–25 ™, 4/90.

Solin Products, Inc., "Product Bulletin No. 11034", for Soak 715 ™, Jan. 1, 1993.

* cited by examiner

ABRASION RESISTANT COATING COMPOSITIONS, METHODS FOR MAKING THEM, AND ARTICLES COATED WITH THEM

CROSS-REFERENCE TO RELATED APPLICATIONS

This application claims inventions disclosed in provisional Application No. 60/126,587 filed Mar. 26, 1999 and provisional Application No. 60/147,328 filed Aug. 5, 1999.

BACKGROUND OF THE INVENTION

This invention relates to abrasion-resistant coating compositions, methods for making them, and articles coated with them.

More particularly, the invention provides an improved silicon-containing cured synthetic resin coating composition which forms a protective, abrasion resistant coating. Such coating compositions are sometimes referred to as silicone hard coat resins, or organo-polysiloxanes, such as the compounds produced by the condensation of hydroxy organo-silicon compounds formed by the hydrolysis of organosilicon halides. The preferred silicon-containing coating compositions include products which combine colloidal silica with various acryloxy or glycidoxy functional compounds, such as acryloxy or glycidoxy functional silanes, or non-silyl acrylates.

Transparent abrasion-resistant coatings made from silicon-containing synthetic resins have been used to coat transparent plastics which do not shatter or are more resistant to shattering than glass, but which are subject to scratching and marring due to everyday contact with abrasives such as dust, cleaning equipment, and ordinary weathering. However, the application of the silicon-containing coating compositions to plastic substrates sometimes requires a primer to improve adhesion between the two materials. In some instances even the use of a primer is inadequate for good adhesion. Moreover, the application of these prior art silicon-containing coating compositions to metal surfaces has met with little success because of inadequate adhesion between the metal and the cured resin.

Even when good adhesion is obtained with the prior art silicon-containing coating compositions, the final top coat does not provide optimum hardness.

SUMMARY OF THE INVENTION

This invention provides a silicon-containing cured synthetic resin coating composition which bonds firmly to plastic and to metal surfaces to provide superior protection from abrasion and chemical attack. The coating composition of the invention includes a base coat layer of cured base coat resin, such as polyurethane, polycarbonate, polystyrene, acrylic, polyolefin, nylon, melamine, ABS, and SAN, which bonds strongly to the metal surface to be protected. A top coat layer of uncured silicon-containing synthetic resin is deposited on the cured layer of cured base coat resin, and heated to create a strong interlinking between the silicon-containing synthetic resin and the cured base coat resin. Thereafter, the silicon-containing synthetic resin is cured by heat, actinic radiation such as UV light, or particle radiation such as electron beam. The final silicon-containing cured synthetic resin coating composition can be clear or pigmented. For example, a base coat of polyurethane-containing resin can include pigment or metallic particles for decorative effect.

Practically any kind of metal surface which has been adequately cleaned can be coated in accordance with this invention. A polyurethane-containing base coat layer can be any of the well-known polyurethane coating compositions, or blends of polyurethane and acrylic resin. The layer of polyurethane or a polyurethane/acrylic mixture is coated onto a clean metal surface by any of the suitable, well-known and commercially available processes, such as spraying or electrodeposition.

DESCRIPTION OF THE INVENTION

The Base Coat Resin

Figure 1:
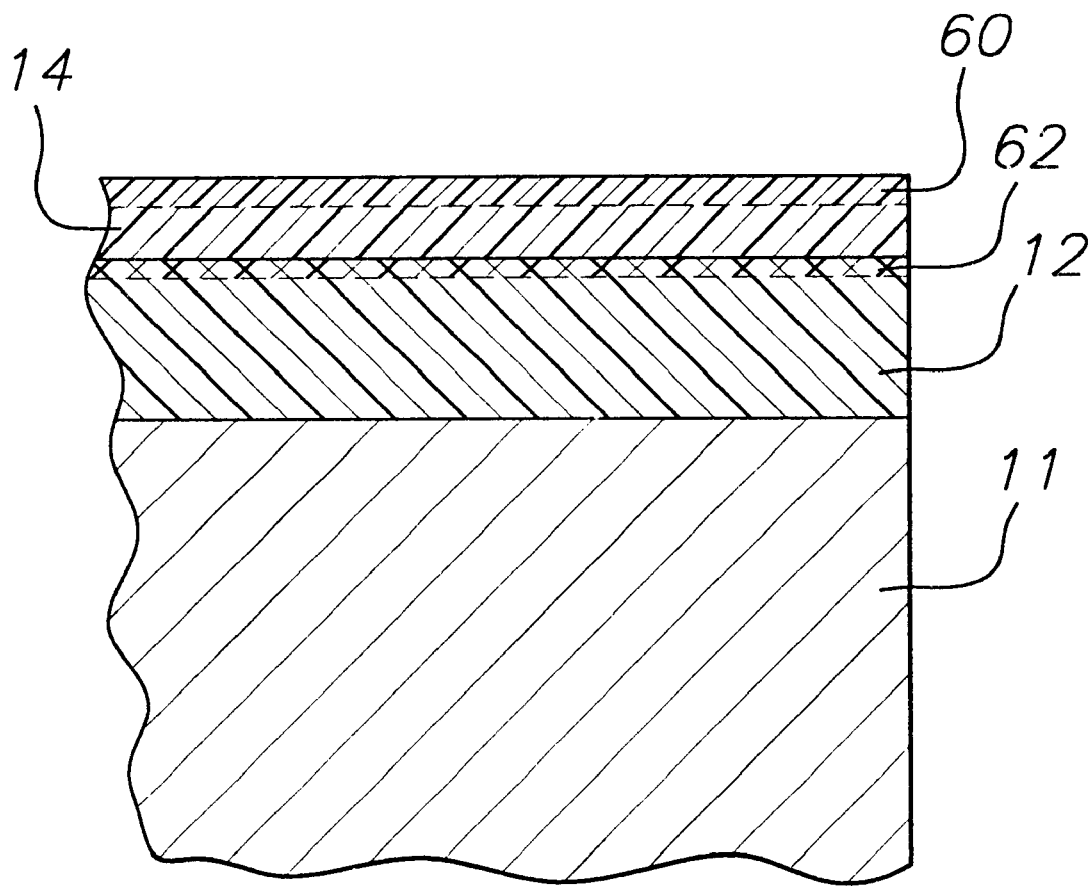
FIG. 1 shows an enlarged cross section a piece of metal coated with a coating composition of this invention.

The base coat or substrate layer of the coating composition of this invention can be any of the synthetic resins identified above. However, the presently preferred base coat is a polyurethane-containing resin. As used herein, the terms "polyurethane resin" and "polyurethane-containing resin" include resins which are either all polyurethane, polyurethane which includes epoxy groups, or an acrylic-polyurethane copolymer as described below, or a mixture of those resins.

My presently preferred process for applying a base coat of a polyurethane-containing resin to metal surfaces is by electrodeposition as disclosed in ClearClad Coatings, Inc.'s Installation and Operation Manual (Release No. 2.0, Manual Series No: 1192, Copyrighted 1997 by ClearClad Coatings, Inc.). A copy of the Manual is attached as Appendix 1. The electrodeposition process described in the Manual is referred to as electrophoretic coating. The process deposits a cross-linked organic polyurethane-containing lacquer coating to any metal with proper treatment as described in the Manual. The base coat of the polyurethane-containing resin can be clear or colored (with pigment), translucent or opaque, and has a substantially uniform thickness over the coated surface, usually in the range of 1–100 microns (0.00004"–0.0040").

For coating aluminum and magnesium surfaces, I prefer to use ClearClad LCX® polyurethane electrocoat enamel supplied by ClearClad Coatings, Inc., and which is described in the manual on page 48. That type of polyurethane electrocoat enamel is described in U.S. Pat. Nos. 3,922,253, 3,947,338, and 4,241,200, which are incorporated herein by reference. The polyurethane electrocoating composition is produced by reacting an isocyanate-terminated prepolymer with a minor amount of peroxide to provide a polyurethane polymer blocked with pendant peroxide groups, and then co-reacting acrylic monomers with minor amounts of other ethylenically unsaturated monomers in the presence of the preformed polyurethane peroxide polymer to provide polyurethane copolymer with those monomers. The resulting polyurethane acrylic block copolymer can also contain carboxyl or amine groups for disbursing into a dilute aqueous solution and provide an anodic or a cathodic electrocoating composition.

As explained in U.S. Pat. No. 4,241,200 (the '200 patent), an aqueous-dispersed electrocoating composition containing an acrylic-polyurethane copolymer is produced by reacting tertiary alkyl peroxide with a diisocyanate to provide a diperoxide blocked urethane prepolymer which functions as a free radical initiator in a subsequent polymerization of acrylic monomers. The polyurethane acrylic copolymer is suitable for use in either anodic or cathodic electrocoating composition.

The most useful peroxide is a t-butyl hydroxymethyl peroxide although other hydroperoxides such as t-butyl hydroperoxide and cumene hydroperoxide can be used. Tertiary-butyl hydroxymethyl peroxides can be produced by reacting molar equivalents of formaldehyde with tertiary-butyl hydro peroxide as shown by Erdy, et al., in J. of Polymer Science, 8, A-I, 763–769 (1970).

Referring to the isocyanate compound to be reacted and capped with a tertiary alkyl peroxide, the polyisocyanate can be a di- or triisocyanate structurally illustrated as:

wherein R can be the same or different and R can be either aliphatic or aromatic group. Suitable polyisocyanates are preferably diisocyanates such as 2,4 or 2,6 toluene diisocyanate, phenylene diisocyanate, hexamethylene or tetramethylene diisocyanate, 1,5-naphthalene diisocyanate, ethylene or propylene diisocyanate as well as trimethylene or triphenyl triisocyanate, and similar di- or triisocyanate. The polyisocyanate can be generally selected from the group of aliphatic, cyclo-aliphatic and aromatic polyisocyanates such as, for example, hexamethylene 1,6-diisocyanate; isophorone diisocyanate, 1,4-dimethyl cyclohexane, diphenylmethane diisocyanate; polymethylene polyphenyl polyisocyanate; and mixtures thereof.

The urethane diperoxide prepolymer is then copolymerized with acrylic ethylenically unsaturated monomers to provide a polyurethane-acrylic copolymer. The urethane diperoxide reacts through the peroxide linkage group wherein each peroxide becomes a free radical initiator which activates the ethylenic double bond whereby the urethane prepolymer free radical reacts with an ethylenic double bond to provide a urethane copolymer. Other activated ethylenic double bonds coreact with other monomer double bonds to provide copolymerized acrylic monomers. The urethane copolymer contains by weight at least about 10% urethane and preferably between 20% and 50% urethane with balance being copolymerized acrylic monomers with minor amounts of other ethylenically unsaturated monomers. The molecular weight of such polymers are preferably between about 3,000 and 50,000. Useful ethylenically unsaturated monomers include, for example, lower alkyl esters of acrylic or methacrylic acid such as methyl-, ethyl-propyl-, butyl-, acrylates or methacrylates, 2-methylhexyl acrylate, n-octyl acrylate, 2-ethylhexyl acrylate, as well as similar methacrylates. Minor amounts of other ethylenic monomers include vinyl aromatic hydrocarbons such as styrene, alpha-methyl styrene, similar alkyl styrene, vinyl toluene, vinyl naphthalene, and divinyl benzene; aliphatic hydrocarbons such as 1,3 butadiene, methyl-2-butadiene, 1,3-peperylene, cyclopentadiene, dicyclopentadiene, 2,3-dimethyl butadiene, and similar conjugated polyolefins; vinyl halides such as vinyl chloride and vinylidene chloride; and vinyl esters such as vinyl acetate. Particularly preferred ethylenically unsaturated monomers include alkyl acrylates and methacrylates with minor amounts of styrene, alpha-methyl styrene, t-butyl styrene, 1,3-butadiene, isoprene, and acrylonitrile.

On a weight basis, the polyurethane-acrylic matrix copolymer contains between 10% and 90% polyurethane, between 10% and 70% acrylic monomer, and up to 50% other copolymerized ethylenic monomers.

The polyurethane-acrylic polymers can be rendered water soluble by introducing pendant amine groups on the polymer to provide an aqueous electrocoating solution suitable for electrocoating onto a cathode substrate. Amine groups can be attached to the polymer by reacting free carboxyl groups with an alkyleneimine or substituted alkyleneimine as suggested in U.S. Pat. Nos. 3,679,564 and 3,617,458. The amine group is reacted with at least 1% of an acid salt proton donor to render the polymer positive ionic for electrocoating onto a cathode substrate. Useful solubilizing salts include proton donating acids such as phosphoric, sulfuric, hydrochloric, acetic, formic, lactic, and similar organic or inorganic acids.

In similar manner, polymers containing carboxyl groups can be solubilized in water by neutralizing with amine salts or bases such as KOH or NaOH and further provide an anodic electrocoating composition. Carboxyl groups can be introduced into the polymer by reacting polycarboxylic acids such as maleic, fumaric, acrylic, or methacrylic acid. Preferred carboxylic acids are acrylic or methacrylic acid. The acid number of the polymer should be between about 20 and 200 and preferably, between 40 and 80. At least about 2% solubilizing salt such as KOH or NaOH is preferred.

The polyurethane-acrylic matrix copolymer containing hydroxyls or carboxyls are adapted to be cross-linked with aminoplast resins such as melamine-formaldehyde. Melamine resins can be selected from melamine or melamine derivatives such as methylol melamine or similar alkylated melamine-formaldehyde reactive resins commonly referred to as aminoplast resins. Melamine resins, for instance, can cross-link hydroxyl containing polyurethane-acrylic matrix copolymers when heat cured at temperatures of about 300° F. to 400° F. for about 20 minutes. Ordinarily about 65–70 weight parts of polyurethane-acrylic matrix copolymer mixed with about 25 to 35 weight parts melamine cross-linker provide a resin mixture containing between about 20% to 40% by weight melamine. Other cross-linkers such as blocked isocyanates, phenolic resins, etc., can also be used.

The polyurethane-acrylic matrix polymer mixed with aminoplast resin can be dispersed in water by adding polymer to a water bath containing the proper solubilizing salt such as proton donor salt for cathodic compositions and amines or bases for anodic compositions. The polymer solids content of the electrocoating bath can be generally between 5% and 25% by weight and preferably, between 5% and 15%. The electrocoating composition can be electrocoated onto a cathode or anode substrate by passing direct electric current between the anode and cathode to electrodeposit a coating onto an anode substrate. The current is reversed for deposition onto a cathode substrate. The substrates are electrically conductive metal such as iron, steel, aluminum, galvanized steel, zinc, chromium, tin, gold, silver, copper, lead, brass, bronze, and similar electroconductive materials.

Electrocoating is carried out at a voltage above the threshold voltage of the electrocoating paint composition which is the voltage at which the polymer will electrocoat due to a direct electric current being passed through the electrocoating bath. The maximum tolerable voltage is slightly below the rupture voltage of the paint coating being applied to the substrate, where the rupture voltage is that voltage which causes the paint film already applied to rupture upon continued application of such voltage. The desirable voltage is between 20 and 500 volts and preferably between 50 and 300 volts. The temperature of the electrocoating bath is generally between 15° C. and 50° C. and preferably between 20° C. and 35° C. Agitation is preferred to maintain uniformity of the dilute polymer solution.

The electrocoating compositions of the '200 patent are further explained in the following examples.

EXAMPLE 1

Tert-butyl hydroxymethyl peroxide is prepared as follows. About 60 grams (0.513 mole) of reft-butyl hydroperoxide is slowly dropped into a 55 gram of formaline solution (37%; 0.67 mole) at room temperature. After the addition is complete, the mixture is stirred overnight (16 hours) at room temperature. The resulting product was vacuum distilled at 8–9 mm of mercury. The boiling point of the product was about 51° C.–53° C. and the yield was about 28 grams.

Isocyanate prepolymer blocked with peroxide is produced as follows. About 8 grams of the tert-butylhydroxymethyl peroxide and 50 grams of Spenkel (from Spencer Kellog Co.) P-49-60CX (an aromatic urethane Mn600, NCO sq. wt. 350) containing 0.07 mole isocyanate functionality plus 0.16 grams of dibutyl acetate are introduced into a reaction vessel. After 4 days of stirring at room temperature, there is still a minor amount of free isocyanate present. About 10 grams of methanol is added to react with the free isocyanate before proceeding further. The resulting product is a urethane diperoxide.

A urethane copolymer is produced by the following: 38 grams of the urethane diperoxide is dissolved in 200 grams of benzene. A monomer mixture of 60 grams styrene, 90 grams of ethyl acrylate, and 30 grams methacrylic acid is dropwise added. The polymerization is conducted under nitrogen and a temperature of about 80° C., and the resulting final copolymer contains approximately 17.4% by weight polyurethane.

EXAMPLE 2

In a manner similar to Example 1, about 400 grams 40% solids (DV-2222) isocyanate (an isocyanate prepolymer, Mn4000, NCO sq. wt. 1300, from Spencer Kellog Co.) is reacted with 20 grams of tert-butyl hydroxymethyl peroxide, 0.4 grams of dibutyl tin acetate, and 0.4 grams of triethylamine are stirred under nitrogen atmosphere in a reaction flask after 4 days. About 10 grams of methanol is added to react with the free isocyanate. The product is a peroxide terminated polyurethane which is then added to 400 grams of benzene. Monomers consisting of 160 grams styrene, 240 grams of ethyl acrylate, and 80 grams of methacrylic acid are added under nitrogen blanket at reaction temperature of about 84° C. The final copolymer contains 25% by weight polyurethane. An electrocoating bath is produced on a weight basis as follows:

| | |
|---|---|
| 208 parts | copolymer |
| 46.5 parts | Cymel 303 (melamine) |
| 24.5 parts | Methylon resin 75108° |
| 1.7 parts | Surfynol non-ionic surfactant |
| 10.7 parts | butyl cellosolve |
| 10.7 marts | Mineral spirits |
| 21.4 parts | hexyl cellosolve |
| 33.3 parts | diisoproplanolamine (85% solution) |
| 384 parts | deionized water |

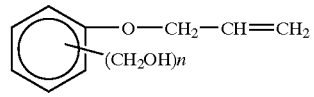

where n=1–3

Upon electrocoating, a smooth coating with excellent flexibility is obtained.

EXAMPLE 3

Similar to Example 1, a peroxide terminated urethane prepolymer is prepared from 40 grams Spenkel P-49-755 (a urethane prepolymer from Spencer Kellog), 100 grams xylene, 15 grams of t-butyl hydroxymethyl peroxide and 0.2 grams of di-butyl tin dilaurate. The mixture is heated at about 50° C. for about 3 hours. Fifty ml. of butyl cellosolve is added and the reaction mixture is then heated to about 90° C. Thereafter, a monomer mixture of 60 grams styrene, 90 grams ethyl acrylate, and 30 grams methacrylic acid is added to the reaction mixture. The polymer has an Acid No. of 52.3. Excess solvent is removed and sufficient butyl cellosolve is added to provide a solids content of 64.9% by weight. The number average molecular weight is determined to be about 20,000. This resin solution is used to prepare an electrocoating bath solution as follows:

| | |
|---|---|
| 57.8 | grams resin |
| 13.9 | grams melamine 10,719–28 (from American Cyanamid) |
| 4.5 | grams dimethylethanolamine |
| 90.8 | grams deionized water |

The resin and melamine are heated together at 150° F.–160° F. and mixed with preheated (160° F.) deionized water containing the dimethylethanolamine. The resulting mixture is diluted with 833 grams water to provide a 5% polymer solids electrocoating solution. Electrocoating is carried out at 130 volts at 80° F. for 15 seconds to provide an electrocoated film of about 0.21 to 0.26 mils. This primer coating is baked at 540° F. for 45 seconds. The resulting coating withstands 100 MEK rubs with only slight surface effect.

The Silicon-containing Curable Synthetic Resin

The silicon-containing curable synthetic resin can be any of many silane, silicone or organopolysiloxane coating compositions, such as are disclosed in U.S. Pat. Nos. 3,451, 838, 3,986,997, 4,027,073, 4,373,060, 4,624,870, 3,707,397, 4,207,357, 4,242,381, 4,284,685, 4,308,317, 4,353,959, 4,615,947, and 5,120,811. These 13 patents are incorporated herein by reference.

I presently prefer to use a silicon-containing curable synthetic resin available from General Electric Company as UVHC 8558™ silicone hard coat resin. Products of this type are disclosed in U.S. Pat. Nos. 4,348,462, 5,242,719, 5,468, 789, 5,607,729, and 5,712,325, which are incorporated herein by reference.

U.S. Pat. No. 4,348,462 (the '462 patent) discloses a silicon-containing coating composition which does not require heat to initiate curing of the product, which is made by the combination of colloidal silica with acryloxy functional silanes or water miscible hydroxy acrylates, or preferably both, with catalytic amounts of UV-sensitive photo-initiators.

The radiation curable coating composition of the '462 patent comprises:

(A) 100 parts by weight of colloidal silica ($SiO_2$). For example, Nalco 1034 is a dispersion colloidal silica of 34% and 66% water by weight.

The dispersion of colloidal silica is used in an amount sufficient to provide 100 parts of silica by weight. Colloidal silica is available in basic or acidic form. Either may be used. However, the acidic form (low sodium content) is preferred.

To the 100 parts colloidal silica (about 294 parts by weight of the Nalco 1034 dispersion) is added (B) 5 to 500 parts, and preferably 50 to 200 parts, of an acryloxy functional silane or glycidoxy functional silane. These silanes assist to impart high abrasion resistance to the coating compounds but it has been found that without more, adhesion is poor. To improve adhesion, there is added in addition to these acryloxy and glycidoxy functional silanes, from 10 to 500 parts, and preferably 50 to 200 parts of (C) a non-silyl acrylate material. Especially preferred acrylates are water miscible hydroxy acrylates. Non-hydroxy acrylates could be utilized but are not preferred since they are less miscible in water. In these systems water is useful as a viscosity reducing agent.

The above described ingredients are catalyzed with catalytic amounts of (D) ultraviolet light sensitive photoinitiators or blends of such initiators. Radical-type initiators can be used alone but it is preferred that a combination of radical and cationic-type photoinitiators be used for improved abrasion resistance. When acidic colloidal silica is used, it is required that there be such a combination of photoinitiators. The radical-type catalysts are used to cure the acryloxy functional portions of the composition. The cationic-type catalysts cure the siloxane portions. A combination of catalysts gives tighter cure properties and improved abrasion resistance.

The catalytic amounts of these photoinitiators may vary, but ordinarily the cationic-type catalyst such as the hereinafter described onium salts are present in an amount of, approximately, 0.05 to 5.0% by weight based upon the amounts of ingredients A, B, and C, and preferably are present in an amount of from 0.1 to 1.5%. The radical type photoinitiators ordinarily are present in an amount of, approximately 0.5 to 5.0% by weight of ingredients A, B, and C, and preferably are present in an amount of, approximately, 1 to 3% by weight.

The radiation curable coating compositions are made by mixing (A) an amount of colloidal silica sufficient to provide 100 parts by weight of silica with 5 to 500 parts of (B) acryloxy or glycidoxy functional silanes or mixtures thereof, and 10 to 500 parts by weight of (C) a non-sylyl acrylate. This mixture is catalyzed by combining it with effective amounts of ultraviolet light sensitive catalysts, which preferably are a blend of radical-type and cationic-type UV catalysts. The catalyzed compositions can then be coated by well known techniques onto selected substrates and cured by exposure to ultraviolet radiation.

The ingredient B is the acid hydrolysis product of an acryloxy-functional silane or the acid hydrolysis product of a glycidoxy-functional silane or mixtures thereof. The acryloxy-functional silane has a general formula:

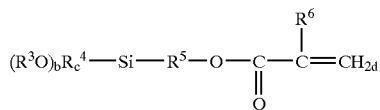

wherein $R^3$ and $R^4$ are the same or different monovalent hydrocarbon radicals, including halogenated species of such radicals. Preferably, $R^3$ and $R^4$ will be lower alkyl radicals such as methyl, ethyl, propyl, etc., but may include other saturated and unsaturated species including vinyl, aryl, etc. $R^5$ is a divalent hydrocarbon radical having from 2 to 8 carbon atoms. $R^6$ is a hydrogen or a montvalent hydrocarbon radical. The letter b is an integer from 1 to 3, c is an integer from 0 to 2 and d is an integer equaling 4–b–c. In many of the embodiments of the present invention, be will ordinarily be 3, c will be 0 and d will equal 1. Specific examples of acryloxy-functional silanes include:

3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane
3-acryloxypropyltriethoxysilane
2-methacryloxyethyltriethoxysilane
2-acryloxyethyltriethoxysilane Such acryloxy-functional silanes are commercially available. For example, 3-methacryloxypropyltrime-thoxysilane can be obtained from Union Carbide or United Chemical Technologies, Inc. The ingredient B of the coating composition may also be a glycidoxy-functional silane instead of the acryloxy-functional silane just described, or it may be a combination or mixture of both types of silanes. A glycidoxy-functional silane has the general formula given by

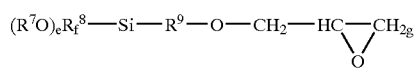

wherein $R^7$ and $R^5$ are the same or different montvalent hydrocarbon radicals as described above for $R^3$ and $R^4$, $R^9$ is a divalent hydrocarbon radical having from 2 to 8 carbon atom. The letter e is an integer from 1 to 3, f is an integer from 0 to 2 and g is an integer equaling 4–e–f. Specific examples of useful glycidoxy-functional silanes are the following:

3-glycidoxypropyltrimethoxysilane
2-glycidoxyethyltrimethoxysilane
3-glycidoxypropyltriethoxysilane
2-glycidoxyethyltriethoxysilane These glycidoxy-functional silanes are also commercially available. One source, for example, is Petrarch Systems, Inc.

Constituent C is an acrylate compound which increases the abrasion resistance of the cured product when used with the colloidal silica described above. These acrylate compositions are considered to be non-silyl functional to distinguish them from the acryloxy functional silanes described above. These acrylates are esters of acrylic acid, but especially preferred are the water miscible hydroxy acrylates.

Among the acrylates which may be utilized in the present invention are:

2-Hydroxy ethyl acrylate
2-Hydroxy ethyl methacrylate
3-Hydroxy propyl acrylate
3-Hydroxy propyl methacrylate
2-Hydroxy-3-methacryloxy propyl acrylate
2-Hydroxy-3-acryloxy propyl acrylate
2-Hydroxy-3-methacryloxy propyl methacrylate
Diethylene glycol diacrylate
Triethylene glycol diacrylate
Tetraethylene glycol diacrylate
Trimethylol propane triacrylate
Tetrahydro Furfuryl methacrylate
1-6-Hexanediol diacrylate To this mixture is added a catalytic amount D, a photoinitiator. Effective photoinitiators are radiation sensitive aromatic halonium, sulfonium or phosphonium salts which have been described in the literature.

Cationic photoinitiators have been described by Crivello in numerous U.S. patents and applications, such as the following, for example, which are hereby incorporated by reference: U.S. Pat. No. 4,136,102 issued Jan. 23, 1979 and U.S. Pat. No. 3,981,897 issued Sep. 21, 1976. Such cationic photoinitiators can have the general formula

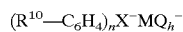

In this formula, X is a radical selected from I, P or S. M is a metal or metalloid and Q is a halogen radical selected from Cl, F, Br, or I. $R^{10}$ is hydrogen or a mono-valent hydrocarbon radical having from 1 to 12 carbon atoms. The letter h is an integer having the value of 4 to 6 inclusive, and n is an integer having the value of 2 or 3.

The expression $MQ_h^-$ applies to any number of ionic species but preferably will be selected from $SbF_6^-$, $AsF_6^-$, $BF_4^-$ and $PF_6^-$. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro phosphate, hexafluoro arsenate, and hexafluoro anfimonate.

It is ordinarily preferable to utilize approximately 0.1 to 1.5 parts by weight of the cationic photoinitiator for every 100 parts by weight of the mixture of ingredients A, B and C as described above. However, depending upon individual desired process parameters such as rate of cure and ultimate abrasion-resistance, the amount of the photoinitiator can range from approximately 0.05 to 5 parts by weight per 100 parts of the mixture of ingredient A, B, and C.

These cationic photoinitiators are particularly effective for initiating a cross-linking reaction upon exposure to ultraviolet radiation. Good hard coatings having excellent adhesion can thus be obtained when the coating composition is applied to a substrate and exposed to radiation such as that provided by UV lamps.

Improved abrasion-resistance is obtained with the same hard coating compositions when in addition to the cationic photoinitiators described above, there is also utilized a radical-type initiator which is effective for cross-linking or self-condensing the acryloxy-functional portions of the silanes contained in the composition. Such radical photoinitiators include among others, benzoin ethers, alpha-acyloxime esters, acetophenone derivatives, benzil ketals and ketoneamine derivatives. Specific examples of these photoinitiators include ethyl benzion ether, isopropyl benzoin ether, dimethoxy-phenyl acetophenone, and diethoxy acetophenone.

The mixed products of ingredients A, B, and C are effectively catalyzed to form satisfactory radiation curable hard coatings by combining 100 parts by weight of such products and mixtures with from, approximately, 0.5 to 5.0 parts by weight of a combination of photoinitiators. The photoinitiator combination is comprised of, approximately, 10 to 90% by weight of a cationic-type initiator such as diphenyliodoniumhexafluoroarsenate and the remaining portion is a radical-type initiator such as ethylbenzoin ether.

Examples of silicon-containing synthetic resins made in accordance with the '462 patent are given below:

EXAMPLE 4

Into a 500 cc-3-necked flask is placed 175 g of Nalco 1034A colloidal silica dispersion (about 59.5 g silica). 47 g of methacryloxypropyl trimethoxysiloxane (MPTMS) (Petrarch System Inc.) is then added drop-wise over a period of 20 minutes at 25° C. After stirring for an additional 40 min., the mixture of 68 g of 2-hydroxyethyl acrylate and 25 g of diethyleneglycoldiacrylate is added. The slightly hazy solution is then combined with 1 g of diphenyliodonium-hexafluoroarsenate and 2.5 g of ethylbenzoin ether as photoinitiators. This catalyzed mixture is flow-coated on Lexan® and air-dried for 40 min. and cured under UV light in 6 seconds in a nitrogen atmosphere to give a clear hard coating with good adhesion.

EXAMPLE 5

To 750 g of colloidal silica (Nalco 1034A) is added dropwise 118 g of 3-methacryloxypropyltrimethoxysilane (MPTMS) (A-174, Union Carbide), at 25° C. After stirring for 15 min., 240 g of 3-glycidoxypropyltrimethoxy silane (GPTMS) (Petrarch System) is added dropwise over the course of 30 min. while the temperature is kept below 30° C. The mixture is then stirred at 25° C. for one hour, and combined with 300 g of 2-hydroxyethylacrylate, 88 g of diethyleneglycoldiacrylate, 88 g of tetrahydrofurfurylmethacrylate, 4.4 g of bistoluyliodonium-hexafluoroarsenate and 15 g of ethylbenzoin ether.

This composition is flow-coated on Lexan and cured under UV-light in 3 seconds to provide a transparent coating having excellent abrasion resistance.

EXAMPLE 6

A mixture of 45 g of MPTMS (A-174) and 10 g of OPTMS (A-187) is added to 150 g of Nalco 1034A during 30 min. at 25° C. After stirring for 4 hours an excess of water and intrinsic solvents are removed under reduced pressure. The thick residue is then combined with 100 g of 2-hydroxy-3-methacryloxypropylacrylate (HMPA), 40 g of diethyleneglycoldiacrylate, 1.2 g of triphenylsulfonium-hexafluoroarsenate and 4 g of diethoxyacetophenone (DEAP). This is coated on Lexan and cured under UV-light within 9 seconds under a nitrogen atmosphere.

EXAMPLE 7

To 300 g of colloidal silica (Nalco 1034A) is added 90 g of 3-acryloxypropyltrimethoxysilane followed by 20 g of 3-glycidoxypropyltriethoxysilane at 20° C. After stirring for an additional 30 min. an excess of water is removed under reduced pressure. The clear residue is combined with 40 g of 2-hydroxy-3-methacryloxypro-pyl acrylate (HMPA) and 40 g of diethyleneglycoldiacrylate (DEGDA). This is irradiated on Lexan in the presence of a catalytic amount of triphenylsulfonium-hexafluoroarsenate and diethoxyacetophenone and cures within 6 seconds under nitrogen.

EXAMPLE 8

A mixture of 150 g of colloidal silica (Nalco 1034A) and 45 g of 3-methacryloxypropyltriethoxysilane is mixed at 25° C. for 2 hours 20 g of HMPA and 20 g of DEGDA are then added followed by 0.6 g of triphenylsulfoniumhexafluoroarsenate and 1 g of diethoxyacetophenone. It is then flow coated on Lexan and drained for 30 min. Upon exposure to UV-light for 10 seconds under nitrogen, a clear high abrasion resistant coating with good adhesion is obtained.

EXAMPLE 9

Three hard coating compositions are obtained by mixing 30% colloidal silica (Nalco 1129), 2-hydroxyethylmethacrylate (HEMA) and 3-glycidoxypropyltrimethoxysilane (GPTMS) according to the parts by weight (pbw) given in the following table. To each of these mixtures is added a blend of photoinitiators consisting of 0.04 parts diphenyliodonium hexafluoroarsenate and 0.04 parts ethyl benzoin ether, wherein the parts are based upon the weight of the total mixture. The catalyzed compositions are flow coated onto Lexan sheets and air dried for 30 minutes. After the coated Lexan sheets had been air dried they are exposed to radiation in a UV processor for 3 seconds thereby producing a cured high abrasion resistant transparent film. The Δ% $H_{500}$ is also indicated in the following table.

| Sample | 30% Colloidal Silica | HEMA | GPTMS | Δ% $H_{500}$ |
|---|---|---|---|---|
| A | 30 pbw | 5 pbw | 5 pbw | 1.7 |
| B | 30 | 9 | 9 | 5.4 |
| C | 30 | 5 | 9 | 2.6 |

EXAMPLE 10

Another high abrasion resistant coating composition is produced by mixing two parts by weight colloidal silica dispersion (Nalco 1034A) with one part of water. To this mixture is added, in a dropwise fashion, one part of 3-methacryloxypropyltrimethoxysilane at 25° C. After stirring for two hours, the resultant mixture is further combined with two parts 2-hydroxyethyl acrylate and 0.15 parts dephenyliodonium hexafluoroarsenate and 0.3 parts ethyl benzoin ether. The catalyzed mixture is flow coated onto Lexan and air dried for 30 minutes whereupon the coating was cured on a UV processor. Several samples all cured to high abrasion resistant coatings showing good adhesion. All samples cured in 6 to 9 seconds of UV exposure and had Δ% $H_{500}$ values of 4 to 7.

U.S. Pat. No. 5,712,325(the '325 patent) discloses an alternate method for making a silicon-containing synthetic resin similar to UVHC 8558 resin available from the General Electric Co. As explained in the '325 Patent, a curable silicon-containing polyacrylate hardcoat composition is made by substantial removal of volatiles at a temperature of 25° C. to 100° C., and 1 torr to 760 torr pressure from a silicon-containing polyacrylate mixture comprising by weight:

(A) 100 parts of the product of reaction at a temperature of about 20° C. to about 100° C. of a mixture of (i) about 5% to about 20% by weight of alkoxysilylacrylate, and (ii) correspondingly about 80% to about 95% by weight of a colloidal silica alcoholic dispersion consisting essentially of colloidal silica in a C(3–5) branched aliphatic alcohol, or a mixture of a C(3–5) branched aliphatic alcohol and a C(1–5) straight chain alcohol, where the colloidal silica is present in the colloidal silica alcohol dispersion at from about 5% to about 70% by weight, (B) about 10 to about 400 parts of at least one polyfunctional reactive acrylic monomer and, (C) an effective amount of gelation inhibitor, where there is present in the colloidal silica alcohol dispersion sufficient water to effect the hydrolysis of the alkoxysilylacrylate.

Some of the preferred $C_{(3-5)}$ branched water miscible alcohols which can be used in the practice of the invention are isopropanol, isobutanol, tertbutanol, and neopentanol.

The gelation inhibitors which can be used in the practice of the invention include aerobic and anaerobic gelation inhibitors. The preferred aerobic inhibitor is methylhydroquinone.

Among the anaerobic gelation inhibitors which can be used are 2,2,6,6-telxamethylpipeaidinyloxy(TEMPO), 4-hydroxy-2,2,6,6-tetramethylpiperidinyloxy (4-OH TEMPO), galvinoxyl, 2,2-d/phenyl-1-picryl-hydrazyl hydrate, Ban-field's radical, 1,3,5-triphenyl verdazyl, Koelsch's radical 1-nitroso-2-naphthol and bis(2,2,6,6-tetramethyl-4-piperidinyloxy)sebacate.

An effective amount of aerobic or anaerobic gelation inhibitor is 10 ppm to 10,000 ppm, based on the weight of reactive acrylic monomer used in the curable silicon containing polyacrylate hardcoat composition.

Some of the alkoxysilylacrylates which can be used in the practice of the method of the invention are shown by the following formula:

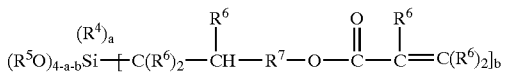

where R4 is a C(1–13) monovalent organic radical, R5 is a C(1–8) alkyl radical, R6 is selected from hydrogen, R4, radicals or mixtures thereof, R7 is a divalent C(1–8) alkylene radical, a is a whole number equal to 0–2 inclusive, b is an integer equal to 1–3 inclusive, and the sum of a+b is equal 1–3 inclusive.

Included within the alkoxysilylacrylates are compounds having the formulas:

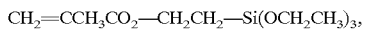

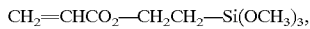

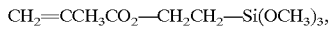

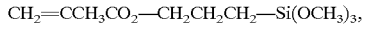

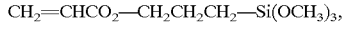

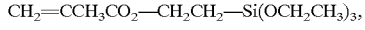

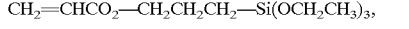

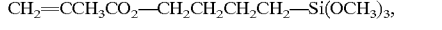

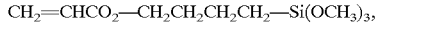

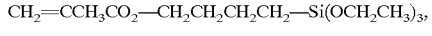

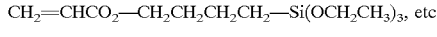

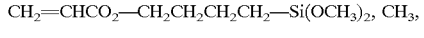

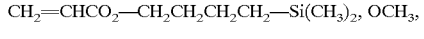

Among the polyfunctional reactive acrylic monomers which can be used in the practice of the method of the invention, are compounds shown by the formula:

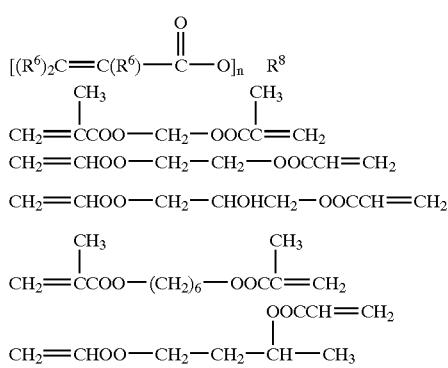

where $R^6$ is as previously defined, $R^8$ is a polyvalent organic radical and n is an integer having a value of 2 to 4.

Some of the reactive acrylic monomers which can be used are for example:

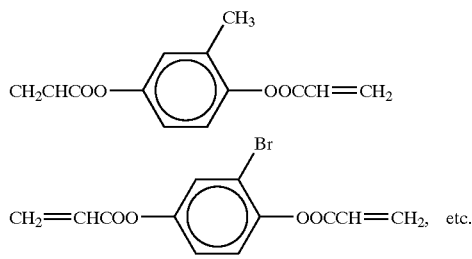

Silicone ester acrylate oligomer (EBECRYL 350, UCB Radcure Inc.) aliphatic urethane diacrylates triacrylates of the formulas:

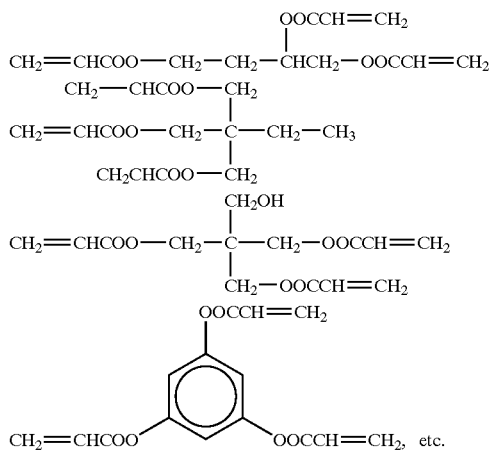

Tetraacrylate of the formulas:

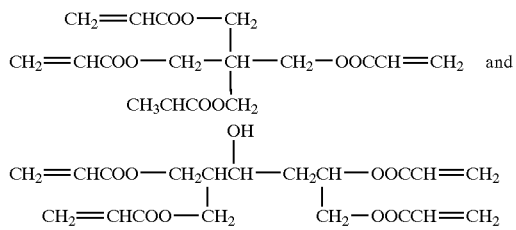

Additional acrylates having at least 3 or more reactive groups are dipentaerythritol monohydroxypenta acrylate, hexafunctional polyurethane acrylate, and silicone aorylate oligomer (Ebecryl 1360, UCB Radcure Inc).

The coating compositions made in accordance with the '325 patent can contain one or more of the polyfunctional reactive acrylic monomers. Preferably a mixture of two polyfunctional reactive acrylic monomers are used and in particular a diacrylate and a triacrylate. In addition, minor amounts of a monoacry late also can be used. The compositions are UV curable or electron beam curable. These compositions can contain nonacrylic UV curable unsaturated organic monomers in amounts up to 50% by weight of the UV curable hardcoat compositions. There are included, for example, such materials as N-vinyl pyrrolidone, styrene, etc.

When the coating compositions of the '325 patent contain a mixture of acrylic monomers, it is preferred that the ratio, by weight, of the diacrylate to the polyfunctional, such as trifunctional acrylate be from about 10/90 to about 90/10. Some of the mixtures of diacrylate and triacrylates which can be used include mixtures of hexanediol diacrylate with pentaerythritol triacrylate, hexanediol diacrylate and trimethylolpropane triacrylate, dietheyleneglycol diacrylate with pentaerythritol triacrylate, and diethyleneglycol diacrylate with trimethylolpropane triacrylate.

While coatings may likewise contain the ultraviolet light reaction product of a single polyfunctional acrylic monomer, coatings which contain the photoreaction product of two polyfunctional acrylic monomers, are preferably the product of a diacrylate and triacrylate.

The photocurable coating compositions also can contain a photosensitizing amount of photoinitiator, i.e., an amount effective to effect the photocure in air or an inert atmosphere, for example, nitrogen, of the coating composition. Generally, this amount is from about 0.01% to about 10% by weight, and preferably from about 0.1% to about 5% by weight of the photocurable coating composition.

Photoinitiators which preferably can be used in a nonoxidizing atmosphere, such as nitrogen, are those selected from the group consisting of:

benzophenone and other acetophenones, benzil, benzaldehyde and O-chlorobenzaldehyde, xanthone, thioxanthone, 2-chlorothioxanthone, 9,10-phenanthrenenquinone, 9,10-anthraquinone, methylbenzoin ether, ethylbenzoin ether, isopropyl benzoin ether, 1-hydroxycyclohexyphenyl ketone. $\alpha,\alpha$-diethoxyacetophenone, $\alpha,\alpha$-dimethoxyacetoophenone, 1-phenyl-1,2-propanediol-2-o-benzoyl oxime, 2,4,6-trimethylbenzoyldiphenyl phosphine oxide, and, $\alpha,\alpha$-dimethoxy-$\alpha$-phenylacetopheone.

The coating compositions made in accordance with the '325 patent may also optionally contain UV absorbers or stabilizers such as resorcinol monobenzoate, 2-methyl resorcinol dibenzoate, etc. In addition, other UV absorbers are benzophenones, benzotriazoles, cyanoacrylates and triazines. The stabilizers including hindered amine can be present in an amount, based upon the weight of the coating composition, exclusive of any additional solvent which may optionally be present, of from about 0.1 to 15 weight percent, and preferably from about 3 to about 15 weight percent.

The coating compositions made by the method of the present invention may also optionally contain various flatting agents, surface active agents, mar resistant additives, thixotropic agents, UV light stabilizers and dyes. Various surface-active agents, also may be used in the coating compositions made by the method of the invention and include anionic, cationic and nonionic surface-active agents. The materials are described in Kirk-Othmer Encyclopedia of Chemical Technology, Vol. 19, Interscience Publishers, New York, 1969, pp. 507–593, and Encyclopedia of Polymer Science and Technology, Vol.13, Interscience Publishers, New York, 1970, pp. 477–486, both of which are incorporated herein by reference.

The following examples show how to make a curable silicon-containing curable synthetic resin in accordance with the '325 patent. All parts are by weight.

EXAMPLE 11

A mixture is heated at 60°–70° C. for 2 hours consisting of 99 g of a mixture of colloidal silica in isopropyl alcohol having a pH of 3–5 containing 30% $SiO_2$, 13 g of methylacryloxypropyltrimethoxysilane, and 0.2 g of galvinoxyl. After heating, 36.2 g of hexanedioldiacrylate is added and the mixture is stripped under vacuum (30 torr) with a nitrogen bleed. This produces 76 parts of a radiation curable purple oil having a viscosity of 56.5 cps.

A blend of 10 g of the purple oil, 10 g of trimethylolpropanetriacrylate, 1.2 g of Vicure® 55, methylbenzoyl formate of Akzo Chemical Co., and 30 g of isopropanol was flow coated onto a polycarbonate substrate and UV cured in air at 20 ft./min. The cured coating was found to be abrasion resistant as shown by the steel wool rub test and it had a yellowness index of 0.8.

The above procedure was repeated except that 99 g of a colloidal silica methanol mixture having 30% by weight of $SiO_2$, 13 g of methylacryloxypropyltrimethoxysilane, and 0.2 g of galvinoxyl were heated for 1 hour at 65° C. There was then added 36.2 g of hexanedioldiacrylate and the solution was stripped. A yellow gel was obtained.

The above procedure using the colloidal silica methanol mixture was repeated except that about 30% by weight of isopropanol was added to the mixture prior to stripping. There was obtained an radiation curable oil having a viscosity of 146 cps.

EXAMPLE 12

A mixture was heated consisting of 520 g of IPAST of Nissan Chemicals (a low pH mixture of 156 g of $SiO_2$ in isopropanol having about 14.9 g of water), 68.3 g of methylacryloxypropyltrimethoxysilane, and 0.75 g of 4-OH TEMPO. The mixture was heated to 83° C. for 3 hrs. and allowed to cool to room temperature. There was then added 183.1 g of hexanedioldiacrylate. While bubbling nitrogen through the mixture, the mixture was stripped at 30 torr for 1 hour at ambient temperatures. After one hour of stripping, the pot temperature rose to 63° C. There was obtained 412.2 g of a radiation curable oil having a viscosity of 53 centipoise.

Application of the Coating Composition of this Invention to a Metal Surface

An example of a finished product of this invention is shown in FIG. 1. A metallic substrate or work piece 11, such as aluminum, stainless steel, nickel, copper, gold, silver, chromium, tin, magnesium, zinc, lead, brass, bronze, or various other metals or metallic alloys, is covered by a base coat 12 of cured polyurethane. The base coat is covered by a top coat 14 of a cured silicon-containing synthetic resin, such as one of those described above.

Figure 2:
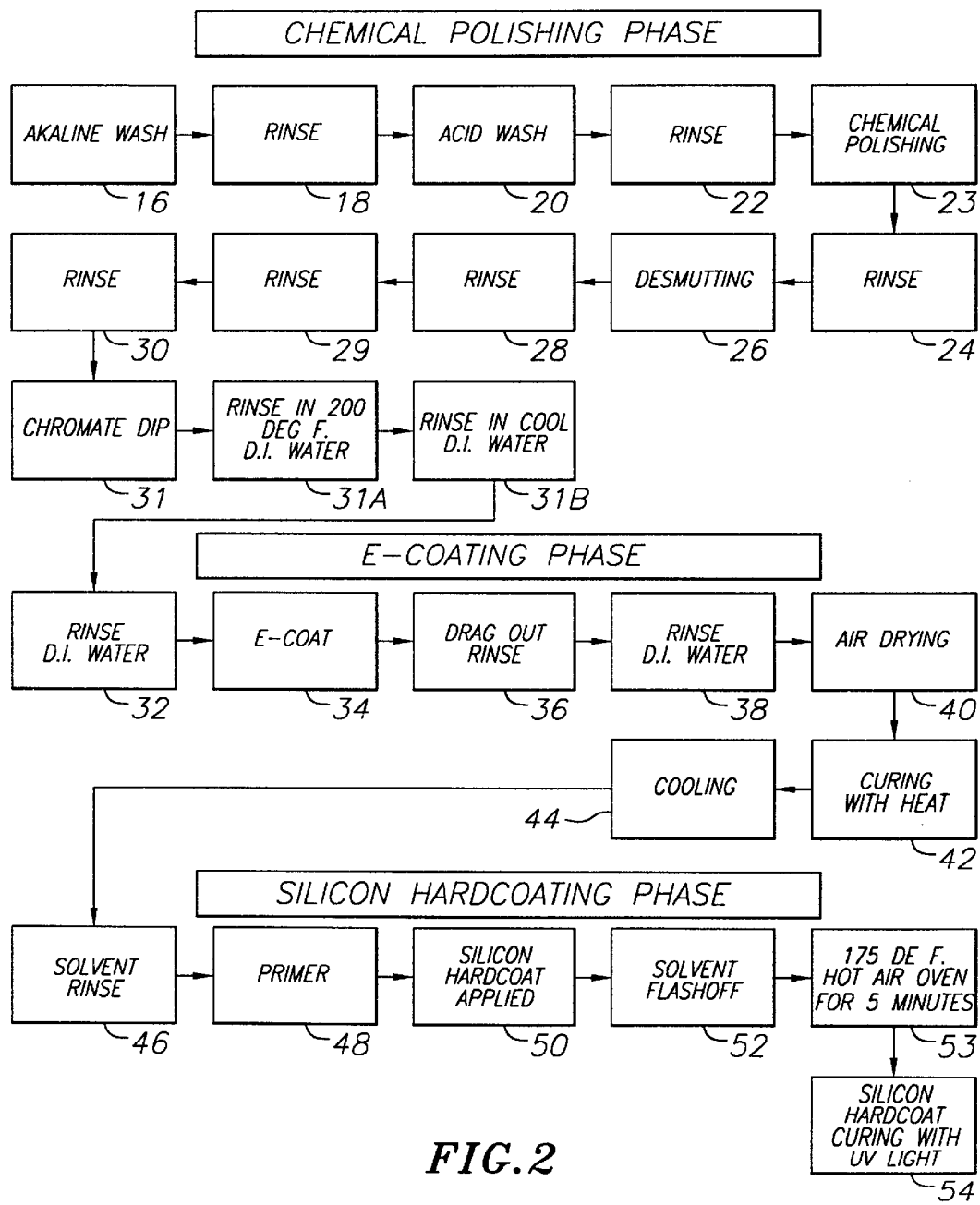
FIG. 2 is a block diagram showing a method for cleaning and coating a metal work piece with a coating in accordance with the invention.

FIG. 2 shows a process for making the product shown in FIG. 1. Referring to FIG. 2, the metal substrate (work piece which can be any of many different types of metal objects, e.g., wheels, tools, hardware or plumbing fixtures, or the like) is subjected to an alkaline wash 16 in a conventional chemical polishing procedure. The alkaline wash can be any suitable aqueous composition, such as Soak 715™ supplied by Solin Products, Inc. of Anaheim, Calif., and described in Solin's Product Bulletin No. 11034 (attached as Appendix 2) issued Jan. 1, 1993 for Soak 715™. The primary ingredient in Soak 715™ is borax, and the solution has a pH of about 10. The metal substrate is subjected to the alkaline wash by spraying, dipping, or agitation at a temperature between about 100° F. to 210° F. for 1–10 minutes, depending on the contaminants which may be on the surface of the substrate to be coated. The metal substrate is then subjected to a first rinse stage 18 in regular water for at least 10 seconds, and then subjected to an acid wash 20 for at least 10 seconds at a temperature between about 100° F. and about 200° F. The acid wash can be any suitable commercially available material. I use AC25™ supplied by Solin, and described in Solin's Material Safety Data Sheet (attached as Appendix 3) dated April 1990 for AC-25™, which is a mixture of phosphoric and sulfuric acids in water, and has a pH between 0.9 and about 2. The acid-washed work piece then passes through a second rinse stage 22 in regular water for at least 10 seconds. The rinsed substrate work piece then passes through a chemical polishing stage 23, such as that described in a Technical Information Bulletin (attached as Appendix 4) published by Albright & Wilson Americas (A&WA). That A&WA bulletin describes how to effect chemical polishing of aluminum in a manner well known to those skilled in the art. If other metals are used as a substrate, appropriate well known chemical polishing procedures are used for the specific metal or alloy employed. For chemical polishing of aluminum, I prefer to use Phosbrite 172™, which is a phosphoric acid-sulfuric acid-nitric acid solution developed by A&WA, and described on page 17 of the A&WA Bulletin.

The chemically polished substrate then passes through a third rinse stage 24 in regular water for at least 10 seconds. The rinsed substrate then passes through a desmutting stage 26, which includes soaking in nitric acid (about 40% nitric acid by weight in water), or a suitable proprietary desmutting solution, such as Solin's Desmut 51™ solution to remove smut. Desmut 51™ is a mixture of concentrated nitric and sulfuric acids, and is normally used at 5% to 12% by volume in water. The desmutted substrate passes through 4th, 5th and 6th rinse stages 28, 29, and 30, respectively. To prevent contamination of the cleaned surface, the 6th rinse stage 30 preferably uses deionized water. The substrate is then moved directly from the 6th rinse stage 30 to a chromate dip 31, which can be any suitable commercially available chromate dip solution and process. For example, in treating aluminum surfaces, I prefer to use BENCHMATE 320P material, which is available from Benchmark Products at 5425 W. 84th Street, Indianapolis, Ind. 46268. To prepare the chromate dip solution, I dissolve 5 grams of the BENCHMATE 320P material per liter of deionized water. The solution has a pH of about 1.5. I immerse the work piece in the chromate dip solution at room temperature for about 10 seconds, and follow that with a seventh rinse 31A in deionized water at about 200° F. for about 60 seconds. Thus, the cleaned surface of the substrate is chromated, which provides added corrosion protection and serves as a good base for the subsequent application of the polyurethane base coat 12 (FIG. 1). The chromate treatment gives good corrosion creep protection if the final coating is compromised by a nick, scratch, cut, or the like. BENCHMATE 320 P is described in Benchmark Product's Technical Data Bulletin (attached as Appendix 5), Benchmark Product's Material Safety Data Sheet (attached as Appendix 6). After the seventh rinse 31A, the chromated substrate is passed through an eighth rinse 31B in deionized water at about room temperature. The substrate is then moved directly from the 8th rinse stage 31B to a ninth rinse stage 32 in deionized water.

The transfer of the substrate from the eighth rinse 31B to the ninth rinse 32 is preferably effected without permitting the surface of the substrate to dry so that it is protected by a film of water at all times during the transfer between the eighth and ninth rinse stages.

The clean chromated substrate work piece is now ready for application of the base coat 12 of polyurethane, which preferably is at least partially copolymerized with one or more acrylic monomers. The base coat is applied by any of the suitable, well-known and commercially available processes, such as dipping, spraying or electrodeposition. Some of the electrodeposition processes are described in U.S. Pat. Nos. 5,756,221, 5,401,823, 5,350,636 (which includes pigments in the urethane coating), 4,973,392, 4,939,216, 4,869,796, 4,617,331, 4,612,049, 4,554,212, 4,547,409, 4,496,672, 4,477,642, 4,416,753, 4,058,444 and 3,869,366. These patents disclose conductive aqueous emulsions of polyurethane compounds suitable for electrodeposition on metallic surfaces. Each of the 15 foregoing patents is incorporated herein by reference.

As indicated above, my presently preferred process for electrodeposition of polyurethane on metal surfaces is disclosed in ClearClad Coatings, Inc.'s Installation and Operation Manual (Appendix 1) (Release Number 2.0, Manual Serial Number: 1192, copyrighted 1997 by ClearClad Coatings, Inc.). The electrodeposition process described in the Manual is referred to as electrophoretic coating. The process deposits a cross-linked organic polyurethane lacquer coating to any metal with proper treatment as described in the Manual. The coating can be clear or colored with pigment, translucent or opaque, and has uniform thickness over the coated surface, usually in the range of 1–100 microns (0.00004"–0.0040").

For coating aluminum and magnesium surfaces, I prefer to use ClearClad LCX® polyurethane/acrylic electrocoat enamel supplied by ClearClad Coatings, Inc., and which is described in the Manual on page 48. The ClearClad urethane/acrylic coating material is supplied as a concentrate, which is diluted with deionized water to form an emulsion coating bath in a coating tank 34 (FIG. 2). Electrodes (anodes), not shown, are placed in the coating bath and made anodic (+) in a direct current (DC) circuit (not shown). The work piece to be coated is placed in the bath and made cathodic (−). As current flows, the resinous polyurethane/acrylic material in the emulsion deposits on the substrate work piece 10. The deposited polyurethane/acrylic is an insulator, and as it coats the metallic substrate, current flow is reduced until the electrodeposition stops. Thus, the coating process gives a uniform thickness over the substrate. Typical time required to apply the polyurethane/acrylic base coat 12 is 30–200 seconds. The final coating thickness is proportional to the voltage applied to the DC source, which generally is in the 10–150 volt range. The higher the voltage, the longer the electrodeposition, and therefore the thicker the deposited polyurethane/acrylic film required to insulate the substrate and stop the coating process.

The electrodeposition process continues until all conductive areas on the workpiece are insulated, giving a uniform thickness over the part being coated. The self-limiting characteristic of the coating process results in good "throwing power" into hard-to coat places. To start coating, the voltage is slowly "ramped up" either automatically or manually to the desired final voltage, which remains on for the time required to achieve a complete and uniform coat. Simple surfaces are completely coated in a relatively short time. Surfaces with complex configurations require longer coating time, which is easily determined by simple experimentation. I prefer to deposit a polyurethane/acrylic film which results in a final cured base coat with a thickness between about 2 and about 100 microns (0.00004"–0.0040"). The base coat can either be clear, or contain pigment, as described in the prior art cited above.

After the substrate is coated with the base coat, it is removed from the coating tank 34 and passed through a tenth rinse stage 36 to remove excess coating material as described in the ClearClad Manual on pages 1–10.

After the excess coating material is removed by rinsing in the tenth rinse stage 36, the work piece is passed through an eleventh rinse stage 38 in deionized water. Thereafter, the polyurethane/acrylic base coat is air dried at drying stage 40 for three to ten or more minutes, depending upon the complexity of the work piece, to allow water to evaporate. The base coat is then subjected to a curing stage 42 in an air-circulated oven (not shown) free of airborne particulate matter, and capable of maintaining the work piece at the desired temperature for up to 15 minutes. Usually, a complete cure is achieved in about 5 minutes, especially if the air-circulated oven uses heated air supplemented by infrared radiation. Ordinarily, the cure takes place at a temperature between about 200° F. to about 375° F. The actual curing temperature depends on the particular coating composition used, and is easily determined by simple experimentation.

The work piece coated with the cured base coat is passed through a cooling stage 44 in air for between 1 and 10 minutes to drop the temperature below about 120° F. It is optionally then passed into a solvent rinse stage 46 to start the process for applying the silicon-containing resin top coat 14 (FIG. 1). The solvent rinse can be any suitable polar organic liquid, such as isopropyl or isobutyl alcohol.

If necessary, the work piece is coated at a primer station 48 with an appropriate primer for the silicon-containing top coat material. I have found that the solvent rinse 46 can be omitted, and that no primer need be used if the top coat is applied by using appropriate silicon-containing curable synthetic resin compositions, such as those described in the patents referred to above and incorporated by reference herein. I prefer to use silicon-containing resin compositions which include a substantial amount of colloidal silica particles to give the finished top coat superior hardness and resistance to abrasion. For example, UVHC 8558™ resin supplied by General Electric Company (and described in U.S. Pat. No. 5,712,325 referred to above) provides a thin, clear, mar-resistant film when applied to the base coat. The UVHC 8558™ resin does not require any solvent rinse or primer, and is applied in an application stage 50 (FIG. 2) by spraying, dipping, flowing, or spin coating. The UVHC 8558™ resin is preferably diluted with isobutyl alcohol to about 25% by weight for spraying, 50%–70% for spin coating, 40%–45% for dipping, and 10%–40% for flow coating. The concentration of the resin is adjusted so that, depending on the method of application, the final cured top coat has a thickness between about 1 micron and about 10 microns (0.00004" to about 0.0004"). In general, the cured base coat should be between about 2 and about 15 times thicker than the cured top coat. I have obtained an excellent coating composition with a cured base coat thickness of about 15 microns, and a cured silicon-containing synthetic resin top coat thickness of about 5 microns, giving a total thickness of about 20 microns for the final coating composition.

The work piece with the uncured top coat resin on the cured base coat resin is then passed through a solvent flash off stage 52 for at least 10 seconds to allow excess solvent in the top coat resin to evaporate. Thereafter, the top coat resin is cured in a curing stage 54 for about one second to about 60 minutes, depending on the composition of the resin, and the curing technique, which can be with ultraviolet light, hot air curing, particle bombardment, such as electron beam, or any combination of those techniques. For example, GE's SHC 5020 resin cures at 266° F. in about 30 minutes. GE's SHC 6000 resin cures at that temperature in about 60 minutes. Curing time varies with the properties of the silicon-containing resin used and the curing method, all of which is easily established by simple experiments to achieve the desired result.

In curing the silicon-containing resin by the application of heat alone, best results are obtained by using a relatively high temperature for a fairly short period of time to minimize the tendency of the cured silicone resin to crack, which can be induced by the difference between the coefficient of thermal expansion for the metallic substrate and the silicone resin. I presently prefer to use GE's UVHC 8558™ resin (which is cured by ultraviolet light, and therefore does not require the application of heat for curing) diluted with isobutyl alcohol as described above for applying the top coat to the work piece prepared as described above. Preferably, after the top coat resin has been applied and passed through the flash-off stage 52 for 20 to 300 seconds, the work piece is then passed into a hot air oven 53 at about 160° F. to 195° F., and preferably at about 175° F. for about 5 minutes. Preferably, the hot air oven includes air circulation so that heat transfer to the part is rapid. This heating step improves the bonding between the silicon-containing top coat resin and the underlying polyurethane/acrylic base coat. Alternatively, this heating in the hot air oven can be reduced in time by minimizing the cooling time for the work piece in cooling stage 44 after the polyurethane/acrylic is cured at about 350° F. Depending on the specific silicon-containing resin used, and the amount of diluent and other volatiles in the silicon-containing resin, the work piece with the cured base coat can be cooled to about 100° F., and the silicon-containing resin can be applied directly to the warm surface of the cured base coat. The heat will cause rapid solvent flash off. Thereafter the silicon-containing resin can be heated to between about 160° F. and 195° F., and thereafter cured. In using this alternative procedure, which reduces the time required for heating in hot air oven 53, care must be taken that the volatile materials in the top coat are not flashed off so fast as to cause bubbles or haze in the final coat, if a clear top coat is desired.

With either procedure, after the volatiles are flashed off and the interface between the top coat and base coat has been heated to above about 160° F. to cause interlinking of the two coats, the work piece passed into the curing stage 54, which for the GE UVHC 8558 resin includes an ultraviolet light source for curing the resin to the final hard top coat. This heating step occurs after substantially all the volatiles have been removed from the uncured topcoat so there is substantially no evaporative cooling effect. This assures that the temperatures of the interface between the uncured top coat and the cured base coat reaches ambient temperatures. It should be pointed out that heating the UVHC 8558™ resin to 160° F., or more, is contrary to the supplier's recommendation that the material not be heated above about 130° F. However, I obtain superior bonding between the silicon-containing resin and the cured base coat by heating the interface between them above about 160° F., and preferably to 175° F. or higher, and thereafter curing the silicon-containing resin with ultraviolet light. Preferably, the ultraviolet light should be at 250 to 360 nm with at least 75 mj/cm$^2$ of minimum energy, as recommended in the GE Product Description Sheet 4979 (December 1994) for "UVHC 8558 ABRASION RESISTANT SILICONE HARD COAT FAST CURE" (attached as Appendix 7). Using one Fusion ultra violet Type H bulb at 300 watts per inch, which applies between about one-half to about joules/cm$^2$ to the surface of the work piece, the UVHC 8558 resin can be fully cured in about one second to about five minutes depending on the size and configuration of the work piece. The UVHC 8558 resin has 100% solids by weight, a viscosity of 20–80 cstk at 77° F., a density of 10 lbs/gal; an abrasion resistance of 10 Taber, d%H500, and a flash point of 81° C.

GE's Material Safety Data Sheet (attached as Appendix 8) for UVHC 8558™ refers to three trade secret components, which are identified in the State of New Jersey as Trade Secret Registry Nos. 1147301 4-5005; 1147301 45137; and 1147301 4-5135.

In another preferred embodiment, I substituted GE's UVHC's 3000 hard coat silicone resin, which contains a uv absorbent, for the UVHC 8558™ resin. The UVHC 3000 resin is cured by uv light as described above for the UVHC 8558 resin, and is described in GE's Material Safety Data Sheet for UVHC 3000 hard coat resin.

In general and for best results, I prefer to use a silicon-containing synthetic curable resin for the top coat which includes a dispersion of colloidal silica, such as described in U.S. Pat. No. 5,712,325 referred to above and incorporated herein by reference. As disclosed in that patent, the preferred resin composition includes between 80 to about 95% by weight of colloidal silica dispersed in alcohol where colloidal silica in the dispersion is between about 5% to about 70% by weight. The curable silicon resin is an alkoxysilylacrylate, preferably of the general formula given above.

I also get good results using a simple mixture of an alkoxysilylacrylate, such as 3-methacryloxypropyltrimethoxysilane (available from United Chemical Technologies, Inc. as M8550-KG), and colloid silica dispersed in an alcohol having 2 to 5 carbon atoms, such as isopropyl alcohol. Nissan Chemical Co.'s IPA-ST is a dispersion of about 30% colloidal silica by weight in isopropyl alcohol. Thorough mixing of one volume of Nissan's IPA-ST colloidal silica dispersion with one to four volumes of the M8850-KG for about one minute provided a silicon-containing curable synthetic resin which made a good top coat when applied to a base coat of cured polyurethane or to a cured polyurethane/acrylic mixture. However, this top coat takes about twice as long to cure with uv light as the above examples which include photoinitiators. Moreover, the final appearance of the more simple top coat is not quite as clear as the other examples. Nevertheless, the more simple top coat forms with the base coat a superior coating composition that protects and adheres firmly to metal surfaces.

The improved coating composition of this invention appears to depend on the heating of the interface between the uncured silicon-containing topcoat and the cured polyurethane-containing base coat. Without this heating step the top coat does not bond firmly to the base coat. Moreover, the heating step appears to cause at least part of the silica to concentrate in a zone 60 (FIG. 1) within 1 or 2 microns of the exposed surface of the top coat. Examination of a section of the cured coating composition on a metal substrate with a scanning electron microscope indicated that most of the colloidal silica concentrated in a zone within 1 or 2 microns of the exposed surface of the top coat, and there was no discernable boundary in a region 62 of the cured coating composition where the uncured top coat resin initially contacted the cured base coat resin.

The coating composition of this invention, applied to metal substrates as described above provides superior bonding, resistance to corrosion, abrasion, and the like. For example, common marking materials widely used by vandals to apply graffiti to exposed surfaces are easily removed by simply rubbing the surface of the article coated as described above with 000 steel wool. This removes the graffiti without marring the surface of the cured silicone resin top coat.

What is claimed is:

1. A coating for a substrate, the coating comprising a top coat layer of ultraviolet-curable silicon-containing synthetic resin of one type bonded to a base coat layer of cured synthetic resin of a different type, and which is in contact with the substrate, the top coat including colloidal silica, an exposed surface, and a zone adjacent the exposed surface where the concentration of the colloidal silica is greater than in the rest of the top coat.

2. A metallic article having a surface covered by a coating comprising a base coat layer of synthetic resin bonded to the surface of the metallic article, a top coat layer of a condensation product of colloidal silica and a silyl acrylate bonded to the base coat layer, the base coat layer being of a type different from the top coat layer, the silyl acrylate having the formula

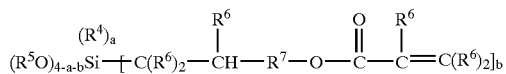

where $R^4$ is a $C_{1-13}$ monovalent organic radical, $R^5$ is a $C_{1-8}$ alkyl radical, $R^6$ is selected from hydrogen, $R^4$, radicals or mixtures thereof, $R^7$ is a divalent $C_{1-8}$ alkylene radical, a is a whole number equal to 0–2 inclusive, b is an integer equal to 1–3 inclusive, and the sum of a+b is equal 1–3 inclusive, the top coat including an exposed surface and a zone where the concentration of colloidal silica is greater than in the rest of the top coat.

3. A coating comprising a base coat layer of a synthetic resin of one type, and a top coat layer of silicon-containing synthetic resin of a different type and colloidal silica, the top coat layer having an inner surface and an outer surface, the inner surface being bonded to the base coat layer of the resin of the one type, most of the colloidal silica being in a zone within about 2 microns from the outer surface of the top coat layer.

4. A coating according to claim 1, 2, or 3 in which the top coat is between about one and about ten microns thick, and the base coat layer is between about two and about 100 microns thick.

5. A coating according to claim 4 in which the base coat layer is between about two and about 15 times thicker than the top coat.

6. A coating according to claim 1, 2, or 3 in which the silicon-containing resin includes colloidal silica in the amount of between about 5 to about 500 parts resin for each 100 parts of colloidal silica by weight.

7. A coating according to claim 1, 2, or 3 in which the silicon-containing resin includes colloidal silica in the amount of between about 50 to about 200 parts resin for each 100 parts of colloidal silica by weight.

8. A coating according to claim 1, 2, or 3 which includes a photoinitiator for accelerating the curing of the silicon-containing resin.

9. An article of manufacture comprising a body having a metallic surface, a base coat layer of synthetic resin of one type bonded to the metallic surface, and a top coat layer of silicon-containing curable synthetic resin of a different type bonded to the base coat to provide a hard protective coating for the metallic surface, the top coat layer including colloidal silica, an exposed surface, and a zone where the concentration of colloidal silica is greater than in the rest of the top coat.

10. An article according to claim 9 in which the base coat is between about two and about 100 microns thick, and the top coat is between about 1 and about 10 microns thick.

11. An article according to claim 10 in which the base coat is between about two and about 15 times thicker than the top coat.

12. An article according to claim 9, 10 or 11 in which most of the colloidal silica is within about 2 microns from the exposed surface of the top coat.

13. An article of manufacture comprising a body having a metallic surface, a base coat layer of synthetic resin of one type bonded to the metallic surface, and a top coat layer of silicon-containing ultraviolet-curable synthetic resin of a different type bonded to the base coat to provide a hard protective coating for the metallic surface, the top coat layer including collodial silica.

* * * * *